United States Patent [19]

Marchello

[11] 3,931,991

[45] Jan. 13, 1976

[54] BICYCLE CHAIN CLEANING TRAY

[76] Inventor: John L. Marchello, Box 100, 57751 Grand River Ave., New Hudson, Mich. 48165

[22] Filed: May 9, 1975

[21] Appl. No.: 576,039

[52] U.S. Cl............. 280/295; 15/256.6; 184/15 R; 74/230; 211/22
[51] Int. Cl.².. B62J 31/00; B62H 3/10; B25H 1/00; F16H 57/05
[58] Field of Search............ 184/15 R, 15 B, 16, 17; 15/256.5, 256.6, 160; 280/289, 293, 294, 295; 74/230; 211/22

[56] References Cited
UNITED STATES PATENTS

| | | | |
|---|---|---|---|
| 506,600 | 10/1893 | Marks | 280/293 |
| 518,325 | 4/1894 | Mueller | 280/293 |
| 583,750 | 6/1897 | Jacobs | 280/295 |
| 584,238 | 6/1897 | Reagan | 15/256.6 X |
| 593,521 | 11/1897 | Fowler | 280/293 |
| 619,796 | 2/1899 | Sennstrom | 280/295 |
| 635,778 | 10/1899 | Hudelson | 15/256.6 X |
| 1,687,688 | 10/1928 | Perry | 184/15 R |
| 1,998,682 | 4/1935 | McCann | 184/15 R |

Primary Examiner—M. H. Wood, Jr.
Assistant Examiner—Jack D. Rubenstein
Attorney, Agent, or Firm—Cullen, Settle, Sloman & Cantor

[57] ABSTRACT

A cleaning tray for use in cleaning and lubricating conventional bicycle drive chains while mounted upon bicycles, said tray being formed to extend between and receive the bicycle rear wheel hub sprockets and the pedal crank sprockets and to fit between the bicycle rear wheel and the chain, with the tray having a wall forming a spray shield to protect the rear wheel during cleaning and lubrication of the chain. The tray includes a guide for positioning part of the chain lower reach into a reservoir portion for immersion in fluid contained therein or for receiving fluid drippings from the chain. Temporary fastening means mounts the tray upon the bicycle frame and a removable stand supports the bicycle in an upright position with its rear wheel elevated above the floor, so that hand rotation of the pedal crank causes the drive chain to move through the tray reservoir.

11 Claims, 10 Drawing Figures

U.S. Patent   Jan. 13, 1976   Sheet 1 of 2   3,931,991
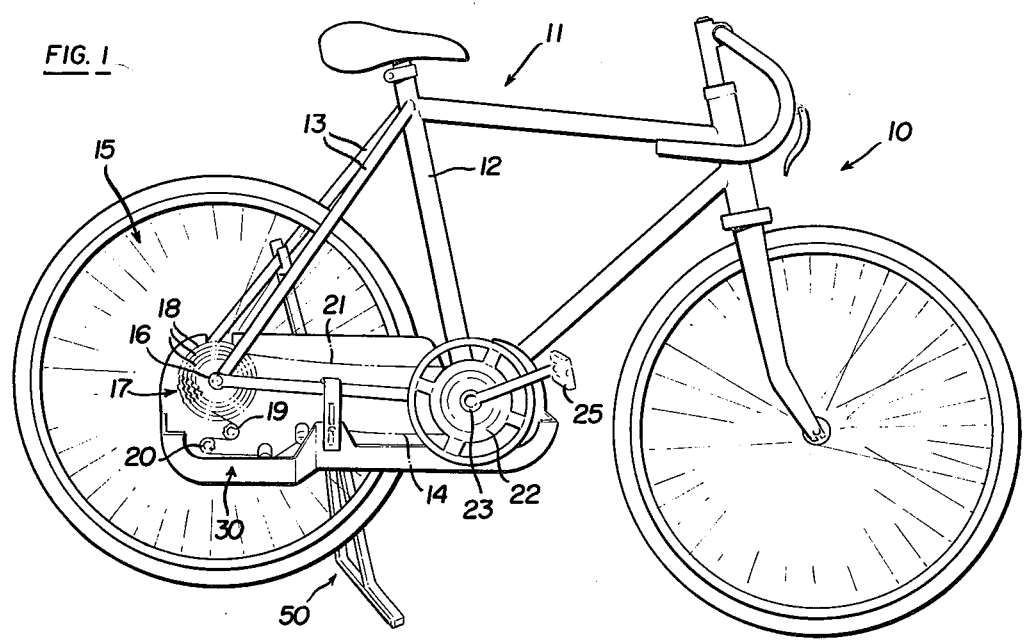
FIG. 1
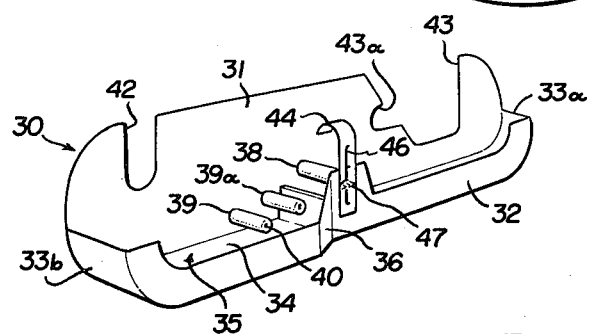
FIG. 2
FIG. 3
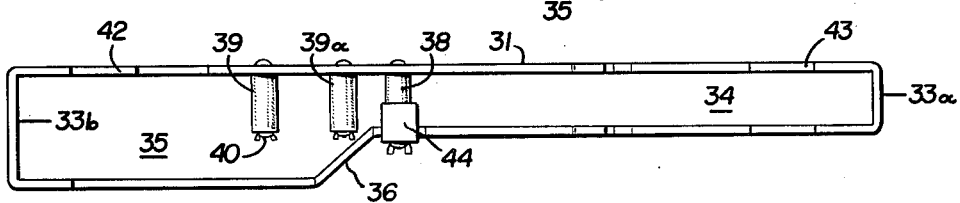
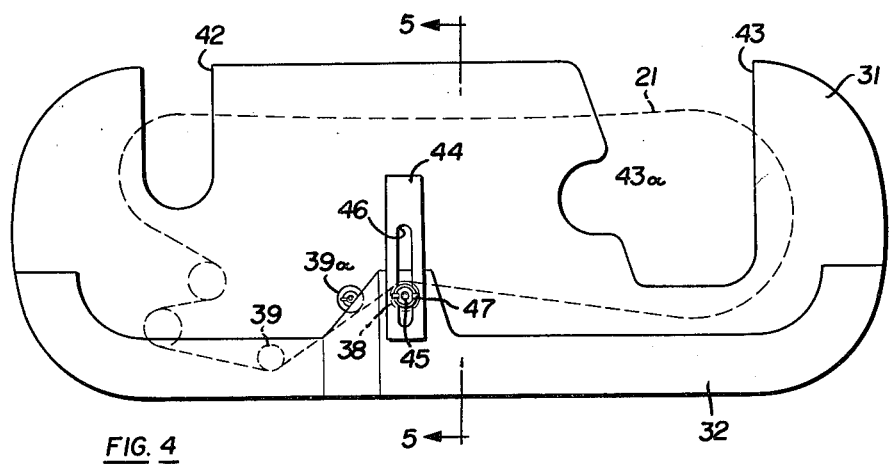
FIG. 4
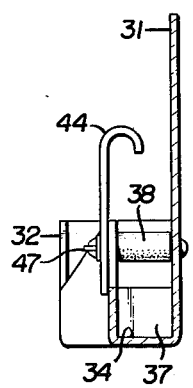
FIG. 5

BICYCLE CHAIN CLEANING TRAY

BACKGROUND OF INVENTION

Conventional bicycle drive chains, and particularly those used on multiple-gear or multiple-speed bicycles which include the so-called derailleur speed shift mechanisms, must be cleaned and lubricated frequently to insure proper operation and to avoid premature failure or disablement of the speed change mechanisms. Since it is relatively difficult and time consuming to remove the drive chain from the bicycle for lubrication and cleaning purposes, most bicycle users either rarely service the chains or if they do, tend to do so while the chain is mounted on the bicycle with the result that the cleaning and lubrication is usually not adequate. Moreover, lubricating or cleaning a chain while mounted on a bicycle usually results in spraying or dripping of the lubricating or cleaning liquids which not only messes the area in which the servicing is done, but further tends to get on to the bicycle rear wheel and tire. Where the tire is of the more expensive or better made type, such fluids, if not promptly removed, tend to damage the tire.

Thus, the invention herein relates to a cleaning tray and accompanying support stand which function as a kit, to position and hold the bicycle for cleaning and lubrication of the chain, without removing the chain from the bicycle, and which obviate spray or dripping damage or mess and also result in better cleaning and lubrication.

SUMMARY OF INVENTION

The invention herein relates to a simplified cleaning tray which is formed for quick and removable mounting upon a conventional bicycle for receiving a portion of the drive chain. The tray includes a wall formed as a splash shield to protect the rear tire of the bicycle and also includes a guide means to guide a portion of the chain into a reservoir which may contain cleaning fluids or alternatively catch fluid drippings from the chain. A simplified mounting means permits quickly attaching the tray to the bicycle frame and equally quickly removing it therefrom. The tray is configured to fit between and to be arranged beneath the bicycle rear wheel hub sprockets and shift mechanisms as well as the pedal crank sprocket set.

In order to clean the chain, the pedal crank is manually rotated to cause the chain to move through the tray reservoir. This requires elevation of the rear wheel off the ground. Thus, to properly hold the bicycle during cleaning of the chain, as well as to elevate the rear wheel, a stand is provided which is formed of an inexpensive construction. The form of the stand permits it to be stored within the cleaning tray so that the stand and the tray together form a composite kit which together may be used by persons of minimal skill, such as children, without difficulty.

Thus, one object of this invention is to provide a tray device and a support stand which together properly position a bicycle and permit easy cleaning and lubrication of the drive chain without removing it from the bicycle and at the same time protect the adjacent area and the bicycle rear tire against spray or dripping of fluids.

These and other objects and advantages of this invention will become apparent upon reading the following description, of which the attached drawings form a part.

DESCRIPTION OF DRAWINGS

FIG. 1 is a view of a bicycle upon which the tray and stand herein are mounted for servicing the drive chain.

FIG. 2 is a perspective view of the cleaning tray.

FIG. 3 is a top plan view of the cleaning tray, drawn to an enlarged scale.

FIG. 4 is a front elevational view of the cleaning tray, and

FIG. 5 is a cross-sectional view of the tray taken in the direction of arrows 5—5 of FIG. 4.

DETAILED DESCRIPTION

Figure 7:
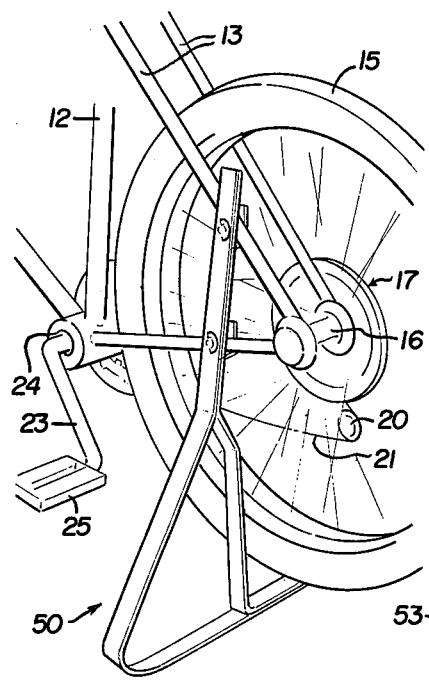
FIG. 7 is a perspective view of the rear portion of the bicycle with the support stand elevating the rear wheel thereof.
Figure 9:
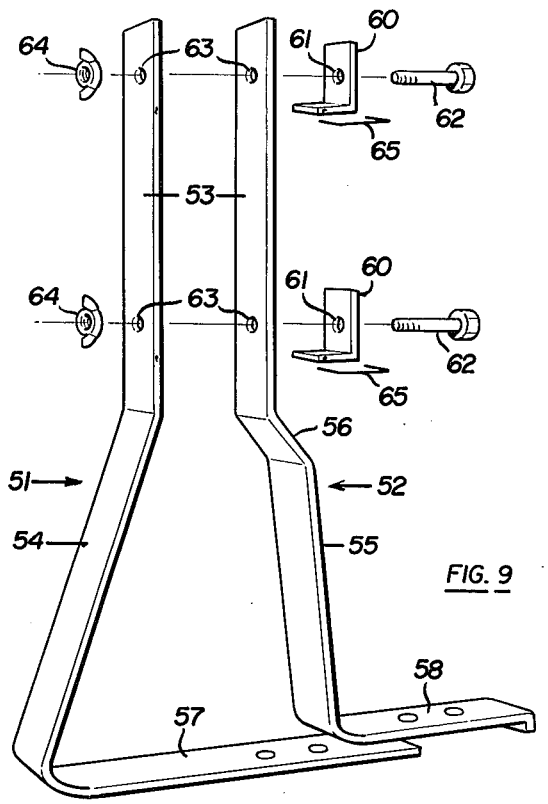
FIG. 9 is a perspective view showing the support stand disassembled.
Figure 8:
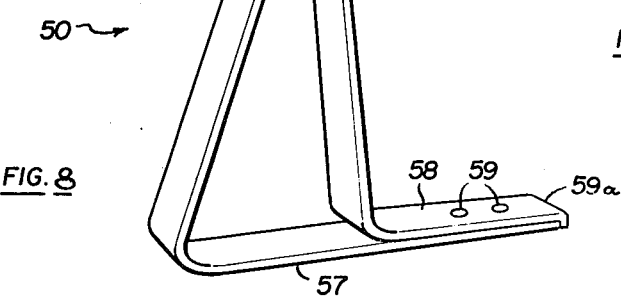
FIG. 8 is a perspective view of the support stand.

FIGS. 1 and 7 illustrate a conventional bicycle 10 which includes a conventional bicycle frame 11 having a seat support frame element 12, rear wheel support frame elements 13 and longitudinal bottom frame elements 14. The rear wheel 15, including the tire and tire hub, fit between the rear wheel support elements 13 to which the wheel hub 16 is secured in a conventional manner.

The bicycle illustrated includes a multiple-speed mechanism commonly referred to as a derailleur 17 which includes a number of sprockets or gears 18, a shift idler or shaft mechanism 19 and a lower sprocket idler 20 through which the endless chain 21 is mounted. The chain passes around pedal crank sprockets 22 to which the pedal crank 23 is fastened, with the pedal crank extending through the pedal hub 24 (see FIG. 7). Pedals 25 operate the pedal crank.

The foregoing is a description of a conventional bicycle construction which forms no part of the invention herein. Thus, the description is limited to those elements which are relevant to the cleaning tray and stand. The particular size, or variations in construction as may be found in the numerous types of conventional bicycles available on the market, are thus schematically illustrated.

Referring to FIGS. 2–5, inclusive, the cleaning tray generally designated as 30 is for the purpose of use in cleaning or lubricating the bicycle chain 21 while the chain is mounted upon the bicycle and passes around its respective sprockets. The tray, which may be formed of suitable sheet metal or of a suitable plastic material, is generally formed with a high rear wall 31 which additionally functions as a splash shield to protect the bicycle rear tire. The tray includes a low front wall 32, and curved end walls 33a and 33b, with a bottom 34.

An enlarged reservoir or sump 35 is formed by widening approximately one-half of the tray, with the widening accomplished by forming an outwardly extending middle portion 26 on the front wall 32.

A low divider wall 37 (see FIG. 2) divides the sump or reservoir portion from the narrowed balance of the tray. Located above the divider wall is a guide pin 38 arranged to engage the lower surface of the bottom reach or loop of the chain.

A pair of rotatable cylindrically shaped brushes 39 and 39a are mounted upon stub shafts 40 arranged within the reservoir portion of the tray. The chain passes beneath and contacts these brushes so that they rub against the inner surface of the chain for cleaning purposes. The brushes may be formed with wire, or plastic, or other suitable bristles. Preferably, they are formed of a foamed plastic, made in cylindrical shape, so that they act as sponges to hold cleaning fluid as they flush dirt off the chain. Wing nuts hold the brushes on shafts 40 for easy replacement.

In order to mount the tray upon the bicycle, the rear, high tray wall 31 is formed with a slot 42 shaped to receive the wheel hub and another slot 43 suitably shaped to receive the pedal crank hub and adjacent mechanism. The slot 43 may be undercut at 43a so that a portion of the wall 31 may be fitted over a portion of the pedal crank hub for supporting the tray.

Located at about the middle of the tray front wall 32 is a hook 44 formed of a narrow, flat, metal strip having a downwardly hook-shaped upper end. The hook is connected to the wall 32 by means of a suitable screw 45 fitted through an adjustment slot 46 in the hook body. A conventional wing nut 47 permits the vertical adjustment of the hook to fit various size bicycle frames. The hook is arranged to fit over the longitudinal bottom frame element 14 of the bicycle for suspending the tray therefrom.

In operation, as shown by the dotted lines in FIG. 4 representing the chain 21, the chain is located in a plane between the planes of the front and rear walls of the tray and is guided over the front guide means or guide pin 38 and under the rear guide means and brush 39 so that a portion of the chain goes through the reservoir 35. Thus, by applying a quantity of cleaning fluid within the reservoir, the movement of the chain therethrough, by means of manually operating the bicycle pedals 25, causes a brushing action by the brush 39 and a cleaning action by the fluid in the reservoir. The cleaning fluid or lubricant, should that be used instead, to some extent, is carried by the chain around the sprocket and shift mechanism portions at the rear wheel as well as around the sprockets of the pedal crank to likewise function to clean and lubricate these parts during the cleaning of the chain. Drippings from the chain are caught by the tray and splashing against the rear bicycle tire and wheel is stopped by the tray rear wall 31. Thus, the cleaning operation is essentially clean.

In order to support the bicycle in an upright position with its rear wheel elevated off the floor for cleaning purposes, a stand 50 is provided. Thus, referring to FIGS. 7–10 inclusive, the stand is formed of a pair of relatively thin, narrow, elongated strips, such as formed of a suitable steel to provide an outer strip 51 and an inner strip 52. The strips each are provided with an upper straight portion 53 with the two straight portions overlapping in face-to-face relationship and being suitably fastened together, as by welding or by suitable mechanical fasteners (not shown). The outer strip is bent to provide an outer leg 54 and the inner strip is provided with an inner leg 55 which preferably is roughly upright, i.e., aligned with the upper portion of the inner leg, but offset therefrom by means of a middle bend or jog 56. Thus, the two legs together form a rough inverted V-shape with the bottom of the V closed by a long horizontal extension 57 formed on the outer strip, which in turn is overlapped by a horizontal extension 58 of the inner strip. The two horizontal extensions are arranged in face to face relationship and are fastened together as by welding or mechanical fasteners 59. Preferably the free end of the horizontal extension 58 is bent over the free end of the horizontal leg 57 at 59a for greater rigidity as well as for appearance.

A pair of L-shaped clamps 60 are loosely secured to the upper portions of the stand strips by means of providing a hole 61 in the clamps to receive screws 62 which pass through aligned holes 63 of the strips and are fastened in place by wing nuts 64. In addition, a wire connector 65, which may be U-shaped, or alternatively, a squared O-shape, fit into holes 66 in the clamp legs and through holes 67 in the outer strip to thereby loosely hold the clamps in place.

Figure 10:
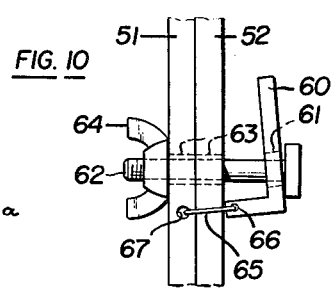
FIG. 10 is an enlarged, fragmentary view of the clamping portion of the support stand.

As shown in the enlarged view in FIG. 10, when the wing nut 64 is threaded upon the screw 62 for tightening the clamp, the clamp pivots about a fulcrum formed by the end of the horizontal leg abutting the face of the inner strip so that the upper portion of the clamp serves to grip a bicycle frame element between the clamp and the inner strip 52. Thus, as shown in FIG. 7, the clamps fasten the stand to the bicycle frame elements 13 and 14 in such a way as to locate the horizontal legs of the stand beneath and transversely of the rear wheel. Thus, the rear wheel is elevated above the ground so that the pedal may be turned for movement of the chain and at the same time the bicycle is supported in an upright position. As can be seen in FIG. 7, the actual attachment of the stand to the bicycle frame causes the stand to be slightly angled relative to the vertical for better support.

Figure 6:
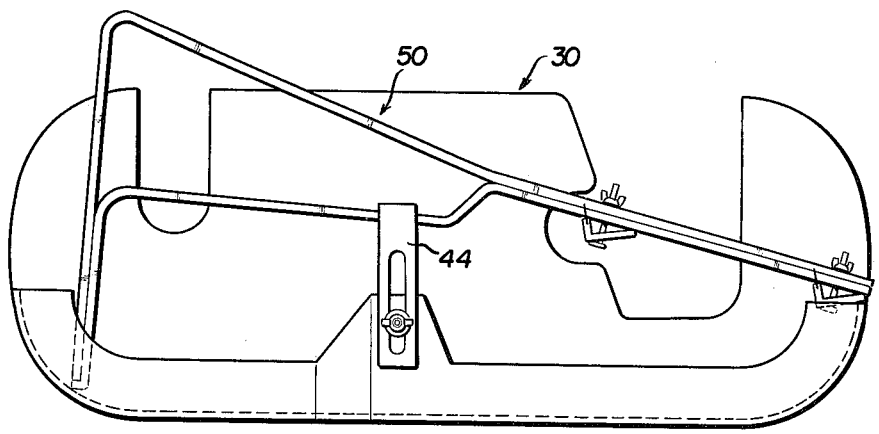
FIG. 6 is a front elevational view illustrating the stand mounted within the tray for storage and handling.

As illustrated in FIG. 6, when the tray is not in use, the stand is of a size and shape to be mounted within the tray, as by catching the inner leg 55 by the hook 44 to thereby secure the stand within the tray for storage and handling. Hence, the two parts are easily kept together and available for use when needed. Since this type of device is expected for use by children, as well as adults, the system for keeping the two parts together and avoiding loss of either, is obviously desirable.

Moreover, the widened reservoir or sump portion of the tray may additionally function as a receptacle for storing bottles or cans containing cleaning fluid and lubricants such as oil, etc. In this manner, a complete cleaning kit is provided all within one container, namely, the tray.

Having fully described an operative embodiment of this invention, I now claim:

1. A cleaning tray for use in cleaning a drive chain of a bicycle of the type having a frame carrying a rear wheel with a hub upon which at least one sprocket-type gear is mounted at one side of the wheel and having a pedal crank mounted upon the frame at a distance forwardly of the wheel hub, with at least one sprocket type drive gear mounted upon the pedal crank and generally aligned with the wheel hub gear, and an endless flexible drive chain normally passing around and interconnecting the drive gear with the hub gear, said tray comprising:

a narrow, horizontally extending bottom and roughly vertical rear and front walls and opposite end closure portions all joined together to form a horizontally elongated, narrow, open top, box-like shape, but with the rear wall being considerably higher than the front wall;

a pair of spaced apart, vertically elongated, open upper end slots formed in the rear wall and shaped to respectively receive the hub portion adjacent the bicycle hub gear and the crank portion adjacent the drive gear so that said gears fit within the tray between the planes of the tray front and rear walls, and the bicycle chain is arranged within the tray, i.e., in a plane located between the tray front and rear walls;

and means for removably fastening the tray upon the bicycle frame, with the tray rear wall arranged between the chain and the bicycle rear wheel;

whereby cleaning and lubricating fluids may be applied upon the chain as it is moved relative to the tray, and the rear wall of the tray additionally shields the rear wheel against spraying of the fluids.

2. A construction as defined in claim 1, and including a divider wall located approximately in the middle of the tray and extending upwardly a short distance from the tray bottom to form a reservoir portion in the tray portion which receives the wheel hub gear;

and a forward transversely extending guide means extending between the tray walls at the upper edge of the divider wall for engaging the lower surface of the lower reach of the chain, and a rear transversely extending guide means extending between the tray walls at a location rearwardly of and below said forward guide means for engaging the upper surface of the lower reach of the chain for thereby guiding a rear portion of the chain lower reach, i.e., the chain lower reach portion between the wheel gear hub and the rear guide means, closely adjacent to the tray bottom and between the tray walls whereby a cleaning or lubricating fluid may be placed within the reservoir and applied to the chain by means of moving the chain therethrough.

3. A construction as defined in claim 2, and wherein said rear guide means is formed with a brush-like configuration for brushing the chain portion guided thereby.

4. A construction as defined in claim 2, and wherein the portion of the tray located rearwardly of said divider wall is horizontally widened relative to the forward portion of the tray.

5. A construction as defined in claim 1 and wherein said means for removably fastening the tray upon the bicycle frame comprising a vertically extending, narrow, rigid strip whose upper end is bent into a downwardly turned hook portion for holding upon an adjacent portion of a horizontal bicycle frame element extending between the wheel hub and the pedal crank;

with the lower portion of the strip being secured to one of the tray walls between the opposite ends thereof by means of a releasible mechanical fastener.

6. A construction as defined in claim 1, and including a support stand for supporting the bicycle in an upright position with its rear wheel elevated above a support floor, said stand comprising:

a pair of upright, elongated, narrow rigid strips secured together in face to face relationship at the upper end portions and then spaced apart in a generally inverted V-shape configuration to form a pair of legs and with their opposite ends bent into a generally horizontal plane so that one leg portion closes the bottom of the V and is overlapped and fastened together to the other leg horizontal portion to form a horizontally extending, double thickness, extension portion for location beneath the bicycle when the upper end portions are arranged at the side of the bicycle frame between the rear wheel and the pedal crank;

and a releasible clamp means for releasible securement to the bicycle frame horizontal frame element which extends between the rear wheel hub and pedal crank, whereby said support stand may support the bicycle upright when the tray is applied thereon;

and said support stand being of a length to fit against the tray rear wall for securement to the tray for handling and storage of the tray and support stand as a unit.

7. A bicycle support stand for supporting a conventional type bicycle in an upright position with the bicycle front wheel rested upon and the rear wheel elevated above the support floor, comprising:

a pair of thin, narrow, elongated, substantially rigid strips having adjacent edge portions overlapped and secured together face-to-face to form an upper end portion;

and the strips diverging downwardly from said upper end portion in a roughly inverted V-shape configuration to form diverging legs;

with the strips at the lower ends of said legs extending horizontally in the same direction to form horizontal portions, with one of the strip horizontal portions closing the space between the lower ends of the legs and being overlapped by the other strip horizontal portion and secured thereto to form a horizontal floor engaging extension portion;

and releasible clamp means mounted upon said upper end portion for manual clamping upon an adjacent bicycle frame element, so that the legs are positioned adjacent one side of the bicycle, and the horizontal extension portion is rested upon the support floor and extends transversely beneath the bicycle.

8. A construction as defined in claim 7, and wherein said clamp means includes at least one L-shaped clamp member having an upright leg arranged closely adjacent to the part of the stand upper end portion to clamp an adjacent portion of the bicycle frame against the stand upper portion and with the free end of the L-shaped clamp generally horizontal leg being abutted against the adjacent part of the stand upper portion as a fulcrum;

and a manually operable screw member connecting and operable to force towards each other about said fulcrum, said clamp upright leg and the adjacent part of the stand upper end.

9. A construction as defined in claim 8, and said clamp means including a second clamp member similar to the first mentioned clamp member and arranged to clamp the stand upper portion to a second bicycle frame element.

10. A construction as defined in claim 8 and including a wire connector having a portion fitted into an opening formed in said clamp member horizontal leg close to the free, fulcrum end thereof, and another portion fitted into a corresponding opening in the stand upper end portion for loosely connecting the clamp member to the stand.

11. A construction as defined in claim 7, and wherein the stand legs are arranged in a plane roughly perpendicular to the length direction of the bicycle, and the leg nearest to the bicycle is roughly in a vertical plane whereas the other leg extends away, at an acute angle, relative to the vertical.

* * * * *